Oct. 30, 1928.
A. S. RAMAGE
1,689,599
PEROXIDE OF HYDROCARBON AND PROCESS OF MAKING THE SAME
Filed April 27, 1925
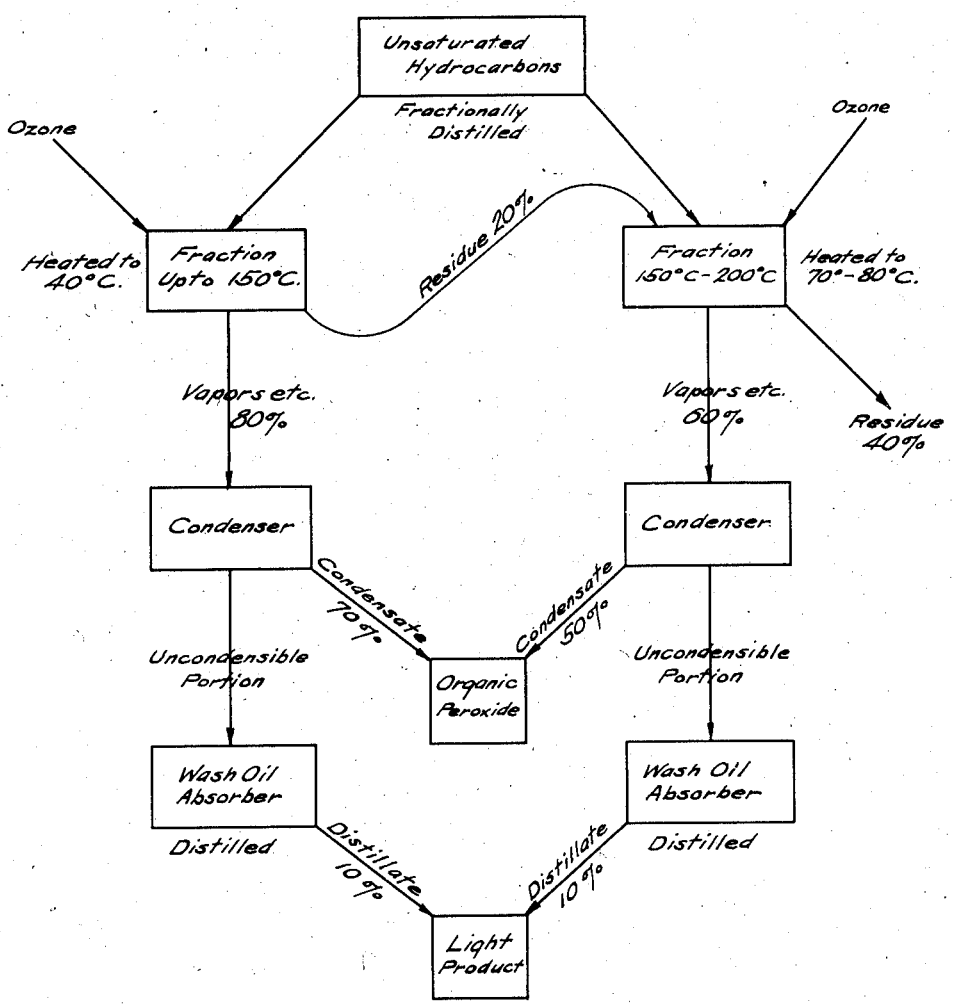
Inventor:
Alexander S. Ramage
By Byrnes Townsend & Buckenstein
his Attorneys Patented Oct. 30, 1928.

1,689,599

UNITED STATES PATENT OFFICE.

ALEXANDER S. RAMAGE, OF DETROIT, MICHIGAN.

PEROXIDE OF HYDROCARBON AND PROCESS OF MAKING THE SAME.

Application filed April 27, 1925. Serial No. 26,295.

This invention relates to the production of peroxides of unsaturated hydrocarbons such as olefins, cyclo-diolefins, cyclo-paraffins, naphthenes, etc., and mixtures thereof, such as are produced for instance by the processes disclosed in United States Patents No. 1,224,787 and No. 1,409,404, and the well known petroleum cracking processes.

The process consists generally in contacting ozonized air or ozone or a gas containing ozone with the hydrocarbons at suitable temperatures.

The accompanying drawing is a flow sheet of the process.

For example, an unsaturated hydrocarbon mixture, such as those produced by the processes of the patents referred to, is preferably distilled and cut into two fractions, one fraction having an end point not over 150° C. and the second fraction being the heavier product, distilling between 150° C. and 200° C. The first fraction is preferably ozonized by blowing ozone or ozonized air through it while it is held at a temperature of 40° C. Practically 80% of the fraction passes over as a dense, white vapor which is subjected to condensation in any suitable manner, about seven-eighths of it condensing the very light uncondensible portion being passed through an ordinary wash oil system using heavy wash oil, from which wash oil a very light product can be recovered by distillation. This light product represents about 10% of the whole fraction treated. Thus I obtain three products,— 20% of residue which will be described hereinafter, 10% from the wash oil of a light product which, provided the starting material is free from saturated products, is admirably suited as a thinner for celluloid varnishes, and 70% of an organic peroxide which in contact with moisture liberates nascent oxygen. This oxygen content can be tested by the usual acidulated potassium iodide solution and estimation of the iodine liberated and calculated to oxygen. It will be found that a peculiar characteristic of this organic peroxide is that it does not liberate its nascent oxygen at once when treated with water, but does so gradually over a period of 36 hours. The light product from the wash oil, during distillation, liberates an enormous amount of gaseous oxygen at a temperature of about 40° to 50° C.

The second fraction boiling between 150–200° C. is added to the residue from the first fraction and the mixture is ozonized as in the case of the first fraction, but at a temperature of about 70–80° C. or even higher. Similar products distill off, and I prefer to stop the ozonization at a point where the residue is about 40% of the quantity of material treated. This residue is a thick, varnish-like body and dries rapidly, giving a tough, hard film. The peroxide or ozonized product which has been vaporized and condensed and which amounts to about 50% of the second fraction is added to the peroxide or ozonized product from the first fraction and similarly the product from the wash oil is added to the corresponding product from the first fraction.

The peroxide or ozonized product from the two fractions which amounts to about 60% of the material treated is extremely well adapted to be used in place of turpentine, due to the fact that in mixtures with drying oils it will dry, for instance raw linseed oil in one-third the time that turpentine will, due to its oxidizing action. Drying alone, which will take place in about 6 hours, it will produce a film which is tough and hard. It is also applicable for increasing the power of gasoline or other motor spirit (with which it is perfectly miscible) due to the liberation of its oxygen.

Should increased drying speed be desired, the unsaturated hydrocarbons may be mixed before, or the products may be treated afterwards, with a little black oxid of manganese, $MnO_2$, which will materially increase the drying speed. The residue of the ozonizing operation may be used as a varnish or as a linseed oil substitute and has the peculiar advantage that it can be mixed with active pigments such as basic chromes, white lead, zinc oxid or even red lead, without livering or becoming hard.

It can be readily seen that any desired degree of varnish may be obtained by the degree of ozonization. For instance, the results stated above are obtained by 3 to 4 hours of ozonization with air containing from 3 to 4% of ozone; and if the ozonization is continued to 5 or 6 hours, the residue left in the still becomes a semi-solid resin which may be used as a varnish gum to temper the hardness of fossil gums.

I claim:—

1. Process which comprises passing ozonized air through a body of liquid containing unsaturated hydrocarbons, subjecting the resulting gases and vapors to condensation, contacting the uncondensed gases and vapors with wash oil, and recovering a product from the wash oil by distillation.

2. Process which comprises separating a hydrocarbon mixture containing unsaturated hydrocarbons into a higher boiling fraction and a lower boiling fraction, passing ozonized air through the lower boiling fraction, thereby producing a first batch of gases and vapors and a first ozonized residue, subjecting said first batch of gases and vapors to condensation, thereby producing a first condensate and a first batch of uncondensed gases and vapors, contacting said first batch of uncondensed gases and vapors with a wash oil, recovering a first wash oil product from the wash oil mixture by distillation, mixing said first ozonized residue with said high boiling fraction, passing ozonized air through the mixture of said first ozonized residue and high boiling fraction, thereby producing a second ozonized residue and a second batch of gases and vapors, subjecting said second batch of gases and vapors to condensation, thereby producing a second condensate and a second batch of uncondensed gases and vapors, mixing said second condensate with said first condensate, contacting said second batch of uncondensed gases and vapors with a wash oil, recovering a second wash oil product from the wash oil mixture by distillation, and mixing said second wash oil product with said first wash oil product.

3. Process which comprises contacting a mixture of unsaturated hydrocarbons with a gas containing ozone at a temperature sufficient to vaporize a portion at least of the resulting peroxides of the hydrocarbons, condensing a portion of the vaporized peroxides and collecting the condensate, and contacting the remainder of the vaporized peroxides with an absorbent oil.

4. Process which comprises passing ozonized air through a liquid hydrocarbon mixture comprising unsaturated hydrocarbons at a temperature of about 40° C., said mixture having an end point of 150° C., condensing a portion of the resulting gases and vapors and absorbing the uncondensed gases and vapors in an oil.

5. Process which comprises ozonizing a liquid mixture of hydrocarbons comprising unsaturated hydrocarbons and having an end point of about 150° C. at a temperature of about 40° C., thereby producing an ozonized residue and a first batch of gases and vapors, condensing a portion of said first batch of gases and vapors, thereby producing a first organic peroxide condensate and a first batch of uncondensed gases and vapors, absorbing said first batch of uncondensed gases and vapors in a wash oil, recovering a first light solvent liquid from the wash oil mixture by distillation, mixing said ozonized residue with a mixture of hydrocarbons comprising unsaturated hydrocarbons and boiling between 150° and 200° C., ozonizing the mixture of said ozonized residue and hydrocarbons at about 80° C., thereby producing a varnish like residue and a second batch of gases and vapors, condensing a portion of said second batch of gases and vapors, thereby producing a second organic peroxide condensate and a second batch of uncondensed gases and vapors, mixing said second organic peroxide condensate with said first organic peroxide condensate, absorbing the second batch of uncondensed gases and vapors in a wash oil, recovering a second light solvent liquid from the wash oil mixture by distillation and mixing said second light solvent liquid with said first light solvent liquid.

6. Process which comprises ozonizing a liquid mixture of hydrocarbons such as may be obtained by cracking petroleum hydrocarbon mixtures.

7. As a new product, a liquid mixture of organic peroxides obtainable by passing ozonized air through a liquid mixture of cracked petroleum hydrocarbons and subjecting the resulting gases and vapors to condensation, the resulting liquid having drying properties and liberating oxygen slowly in the presence of water.

In testimony whereof, I affix my signature.

ALEXANDER S. RAMAGE.